United States Patent
Morgan et al.

(10) Patent No.: US 12,303,047 B2
(45) Date of Patent: May 20, 2025

(54) SYSTEM AND METHOD FOR INTERFACING BETWEEN A VISION CHECKOUT SYSTEM AND A SELF-SERVICE CHECKOUT TERMINAL

(71) Applicant: NCR Voyix Corporation, Atlanta, GA (US)

(72) Inventors: Kip Morgan, Atlanta, GA (US); Gina Torcivia Bennett, Lawrenceville, GA (US); John Kennedy, Lawrenceville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 30 days.

(21) Appl. No.: 18/217,258

(22) Filed: Jun. 30, 2023

(65) Prior Publication Data
US 2025/0000282 A1 Jan. 2, 2025

(51) Int. Cl.
*A47F 9/04* (2006.01)
*G06Q 20/18* (2012.01)

(52) U.S. Cl.
CPC ............. *A47F 9/048* (2013.01); *G06Q 20/18* (2013.01)

(58) Field of Classification Search
CPC ....... A47F 9/048; G06Q 20/18; G06Q 20/208
See application file for complete search history.

(56) References Cited

U.S. PATENT DOCUMENTS

| | | | |
|---|---|---|---|
| 11,238,425 B2 | 2/2022 | Chandran | |
| 2016/0012404 A1* | 1/2016 | Burton | G06Q 20/201 705/20 |
| 2020/0104565 A1 | 4/2020 | Zucker et al. | |
| 2021/0374699 A1* | 12/2021 | Barkan | G06V 20/64 |
| 2024/0046765 A1* | 2/2024 | Parvu | G07G 1/0063 |

* cited by examiner

*Primary Examiner* — Sonji N Johnson
(74) *Attorney, Agent, or Firm* — Notaro, Michalos & Zaccaria P.C.; John S. Economou

(57) ABSTRACT

A self-service checkout system includes a processor and a non-transitory computer-readable storage medium storing executable instructions. The executable instructions when executed by the processor cause the processor to perform operations including: receiving a message from a vision system that includes a list of identified items on a tray positioned adjacent to the vision system for a current transaction and one or more issues related to an identification of the items on the tray, processing the message to identify the one or more issues related to the identification of the items on the tray, providing a user interface for a customer to correct the one or more issues related to the identification of the items on the tray, and completing the current transaction once the issues related to the identification of the items on the tray are corrected.

18 Claims, 5 Drawing Sheets

SYSTEM AND METHOD FOR INTERFACING BETWEEN A VISION CHECKOUT SYSTEM AND A SELF-SERVICE CHECKOUT TERMINAL

FIELD

This disclosure relates generally to a system and method for interfacing between a vision checkout system and a self-checkout terminal, and more particularly to a system and method for interfacing between a vision checkout system and a self-service checkout terminal that provides a standardized way of interfacing between equipment from different suppliers.

BACKGROUND

A vision system for use with a self-service checkout terminal is a technology that incorporates computer vision and image processing techniques to enable automated product recognition, item tracking, and transaction handling in a self-checkout environment. The vision system uses cameras and specialized software to capture, analyze, and interpret visual information from the items being scanned by customers. The vision system interfaces with software in the self-checkout terminal to relay the recognized items, quantities, and prices. The vision system must be coupled via an interface to the point-of-sale (POS) system in the self-service checkout terminal and automates the transaction process by sending the item details for pricing, discounts, and payment processing. By leveraging a vision system, self-service checkout terminals provide a more efficient and streamlined experience for customers, reduce reliance on manual intervention, minimize errors, and improve overall accuracy and convenience during the checkout process. However, the interface between the vision system and the software in the self-service checkout terminal can be difficult to implement because the separate systems typically have incompatible application programming interfaces (APIs).

There are numerous challenges that can arise when connecting two machines with incompatible APIs, including: (1) protocol incompatibility that often arises when machines communicate using different protocols or data formats; (2) data format mismatch that can arise if the machines use the same underlying protocol but different data formats to exchange information; (3) versioning and compatibility issues that arise as the APIs evolve over time and when newer versions introduce changes to functionality that deprecates the original compatibility; (4) authentication and authorization issues that can arise if the systems have incompatible authentication protocols or authorization mechanisms; (5) error handling and exception handling issues; (6) semantic and functional differences; and (7) and insufficient or outdated documentation. To address these problems, various approaches may be adopted, such as developing custom adapters or middleware to bridge the gap between the incompatible APIs, implementing data transformation mechanisms, or exploring API translation tools.

The present disclosure describes a technical solution that solves the above-noted technical problems and ensures a seamless communication interface between the vision system and the self-service checkout terminal.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

A conventional point-of-sale (POS) terminal may include a web server for receiving external communications by way of a Hypertext Transfer Protocol (HTTP) PUT message from a mobile shopper (via an application or mobile device) in order to complete a transaction. A PUT message is a type of HTTP request method used to send data from a client (such as a web browser or an application) to a web server and is commonly used for submitting data to be processed and stored on the server. When making a HTTP PUT request, the client sends a message to the server that includes an HTTP header and a message body. The header may contain information such as the HTTP method (PUT), the URL of the server endpoint, and additional metadata about the request. The message body contains the data that needs to be sent to the server. The message body can be formatted as an Extensible Markup Language (XML) file (according to an XML schema) message pushed to the web server via an HTTP PUT message.

Figure 1:
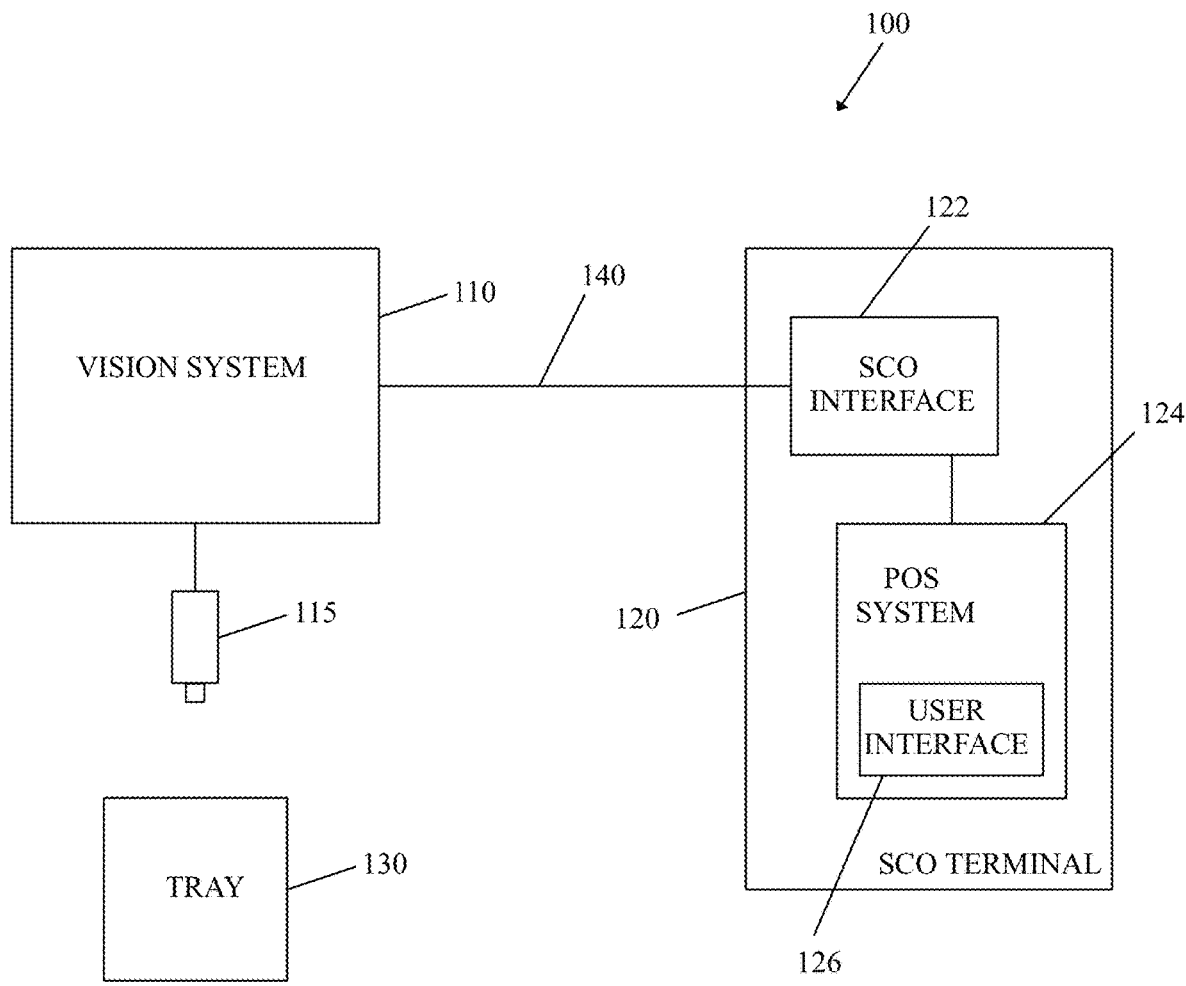
FIG. 1 is block diagram of a system incorporating a vision system into a self-service checkout system according to the present disclosure.

Referring now to FIG. 1, a system 100 for vision-based checkout includes a vision system 110 that has one or more (typically several) cameras 115 focused on a tray 130. The vision system 110 processes the information received from cameras 115 in order to identify all products that have been placed on the tray 130. The vision system 110 is coupled to a self-checkout terminal 120 via a communications link 140 such as a local area network. The self-checkout terminal 120 includes a self-checkout interface 122 that is coupled to a POS system 124 having a user interface 126. The self-checkout interface 122 may be a web server coupled to the communications link for receiving HTTP PUT requests from clients such as the vision system 110. The user interface 126 may be, for example, a separate touch screen or a display with an associated keypad. The vision system 110 is a computer-based system that may use an architecture like the computing device shown in FIG. 6 and described below. Instead of outputting information via an API that may be custom or proprietary, the vision system 110 outputs a message formatted as an HTTP PUT message that includes information about all of the products that have been identified on the tray 130. The HTTP PUT message is sent every time a change of status at the tray is detected. This information is formatted according to a predetermined XML schema such as that used for mobile shopping applications. Because XML is extensible, the XML schema is augmented to allow for the transmission of images and related bounding boxes. This provides a mechanism for the customer to help identify unrecognized items as discussed below. In addition, fields may be added to the XML schema to indicate item placement errors and other types of error. The expansion of the XML schema allows a customer to correct issues before completing the current transaction without the need for assistance from vendor personnel.

Figure 2:
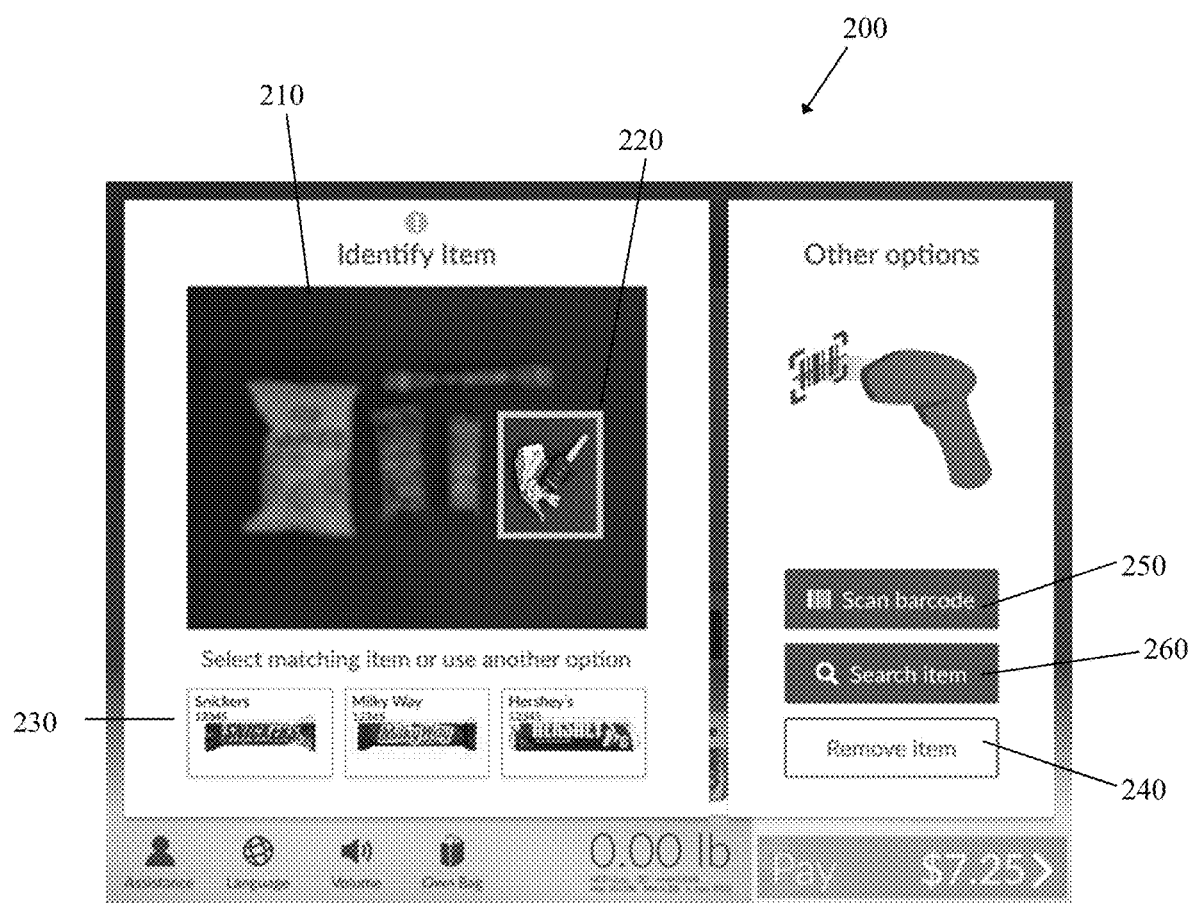
FIG. 2 is a diagram of an output on a user interface of the self-service checkout system according to the present disclosure that shows how a bounding box and a scanned image can be overlaid in order to address unidentified items.

When an item is unrecognized, a field in the XML file may be marked to indicate that the tray currently includes an unrecognized item and to include a unique object ID associated with the image (or the set of images) captured with the item. The POS system 124 processes the current XML file and generates a display on the user interface 126. An example user interface display 200 is shown in FIG. 2, which includes the image 210 with a bounding box 220 around the unrecognized item. If an object is detected but below a predetermined level of confidence, the POS system may provide a section 230 on the user interface display 200 that has suggested (best guess) items (i.e., a menu of candidate items). A customer may choose among the alternative best guess options presented in section 230 or may simply elect to choose the remove item option 240. When the customer identifies an item in this manner, a record may be kept of the barcode captured in the image for future model training. If no suggestions are correct and the item is part of the desired transaction, the customer can select the scan barcode option 250 and scan the item with a barcode scanner provided as part of the POS system 124. Alternatively, the customer may choose the search item option 260 on the user interface display 200 to gain access to a search function for the particular item. This data may also be stored for use in further model training.

Figure 3:
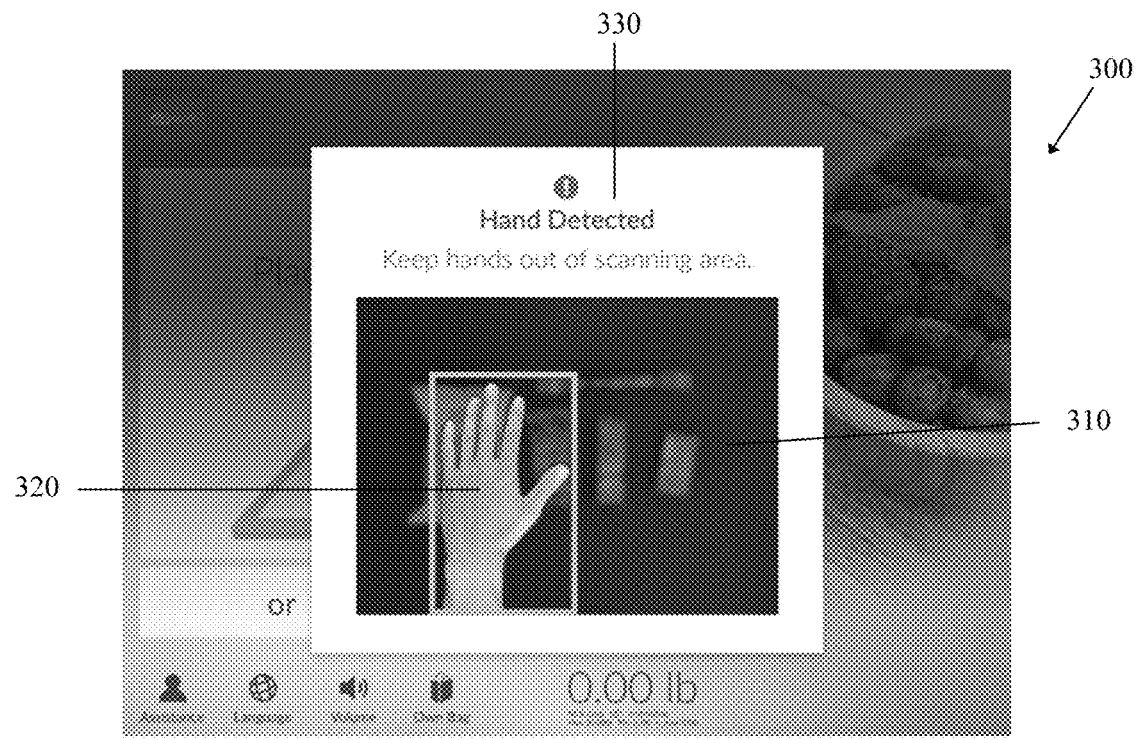
FIG. 3 is a diagram of an output on the user interface of the self-service checkout system according to the present disclosure that shows how a bounding box and a scanned image can be overlaid in order to address one type of item placement error.
Figure 4:
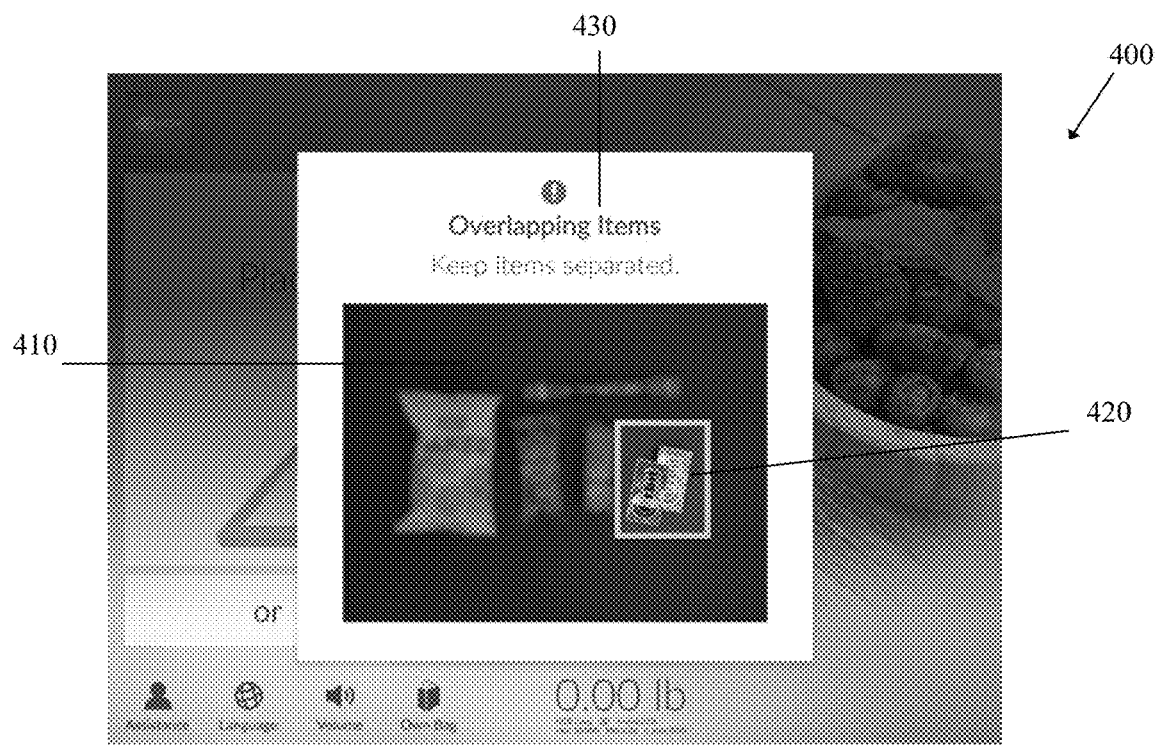
FIG. 4 is a diagram of an output on the user interface of the self-service checkout system according to the present disclosure that shows how a bounding box and a scanned image can be overlaid in order to address another type of item placement error.

As shown in the example user interface display 300 in FIG. 3, the vision system 110 may also be used to identify (and convey to the POS system 124) an item placement error and the type of error. Here, a hand was positioned over the tray 130. The display 300 shows the image 310 with a bounding box 320 around the hand and a banner 330 indicating "hand detected." Similarly, in FIG. 4, the display 400 shows the image 410 with a bounding box 420 around overlapping products located on the products and a banner 430 indicating "overlapping items." Similar messages can be provided for other error conditions such as products on the edge of the tray. The customer may correct the errors and the POS system 124 will then process the next received message from the vision system 110 instead.

The POS system 124 may configured to convert to a conventional checkout terminal using a barcode scanner if no messages are received from the vision system 110 after a predetermined period of time. This ensures that POS system 124 does not go out of service when the vision system is not operating. Because the current system 100 operates on a push basis, i.e., messages are received only when items change on the tray 130, an additional heartbeat field (tag) may also be added to the XML Schema. This allows the vision system 110 to send the push messages at predetermined intervals when no change occurs at the tray 130 to the SCO interface 122 with the heartbeat field set as active. When the heartbeat field is set as active, the POS system 124 keeps operating in conjunction with the vision system 110 but is instructed to ignore any image and item data within the current XML message.

This interface provides an easy way for a developer to use nearly any modern computer language to implement and convert a traditional self-checkout lane into a vision checkout lane.

Figure 5:
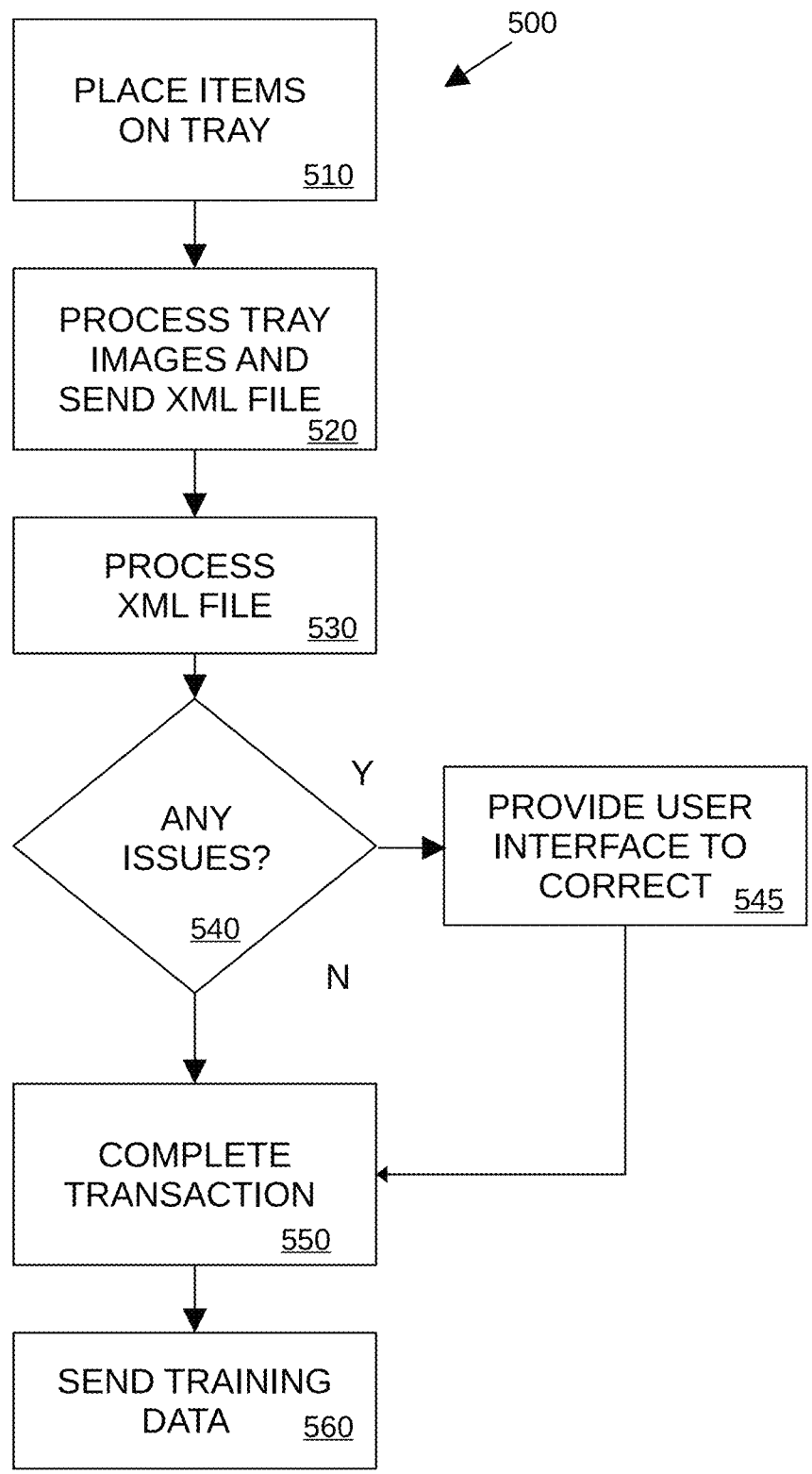
FIG. 5 is a flowchart showing the operation of the system incorporating the vision system into the self-service checkout system according to the present disclosure.

Referring now to the flowchart 500 of FIG. 5, when the system and method of the present disclosure are added to a self-service checkout terminal that is linked to a vision system, a customer first places items for purchase on a designated tray 130 at step 510. The vision system 110 generates images of the tray using the cameras 115, processes the images to identify the items on the tray 130, and then forwards an XML file that identifies the items (and any issues) to the SCO interface 122 at the self-service checkout terminal 120, at step 520. The XML file is forwarded to the POS system 124, which processes the XML file for payment by the customer, at step 530. It is determined whether any issues are included with the list of items, at step 540. If there are any issues, the POS system 124 provides the customer with screens via the user interface 126, at step 545, that allow the customer to correct the identified issues. If there are no issues or after the issues are corrected, the POS system 124 allows the customer to complete the transaction at step 550 by, for example, presenting a list of the items to be purchased and the total cost, and allowing the customer to make payment. Finally, the POS terminal 124 may then send any accumulated training data acquired via the interactions at step 545 to the vision system 110.

Figure 6:
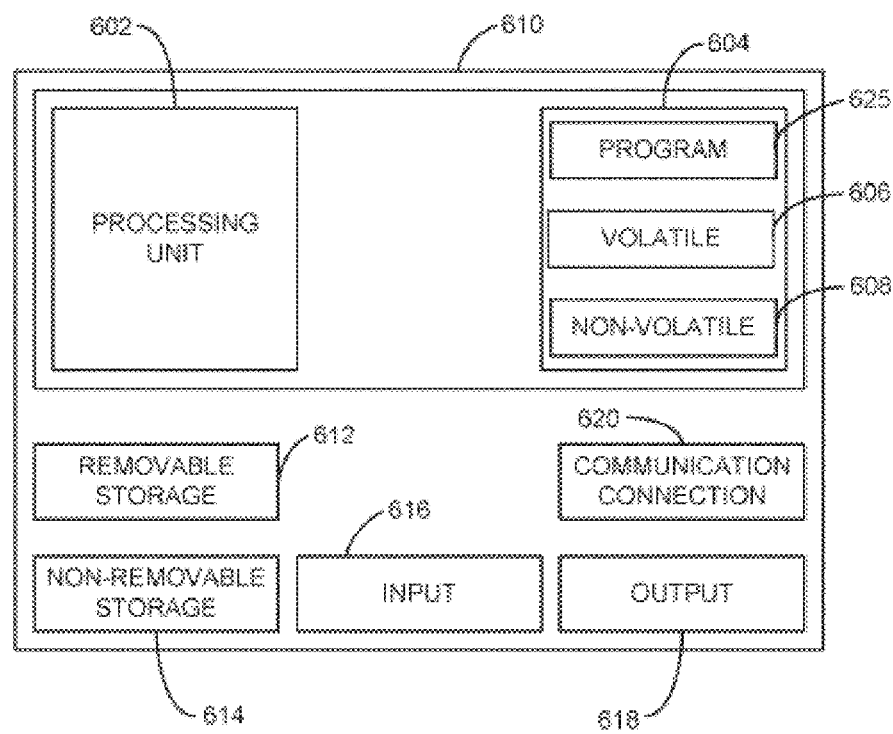
FIG. 6 is a block diagram of a computing system for use with the self-service checkout system according to the present disclosure.

FIG. 6 is a block diagram of a computing device according to an example embodiment for use in implementing the self-service checkout terminal and/or the vision system. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6 Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610. and other input devices. The computer 610 may operate in a networked environment using a communication connection 620 to connect to one or more remote computers, such as database servers, web servers, and other computing devices. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A self-service checkout system, comprising a processor and a non-transitory computer-readable storage medium comprising executable instructions, that when executed by the processor, cause the processor to:
   receive a message from a vision system that includes a list of identified items on a tray positioned adjacent to the vision system for a current transaction and one or more issues related to an identification of the items on the tray;
   process the message to identify the one or more issues related to the identification of the items on the tray;
   provide a user interface for a customer to correct the one or more issues related to the identification of the items on the tray;
   completing the current transaction once the issues related to the identification of the items on the tray are corrected; and
   wherein the message from the vision system includes a heartbeat field that, when set as active, provides an indication that the vision system is active and that any other information in the message is to be ignored.

2. The self-service checkout system of claim 1, wherein the message from the vision system is received via a communications link.

3. The self-service checkout system of claim 1, wherein the executable instructions when executed by the processor cause the processor to operate a webserver.

4. The self-service checkout system of claim 3, wherein the message from the vision system is received by the webserver as an HTTP PUT message.

5. The self-service checkout system of claim 4, wherein the message from the vision system is formatted using extensible markup language.

6. The self-service checkout system of claim 1, wherein the executable instructions when executed by the processor cause the processor to identify that the heartbeat field in the message from the vision system is set as active.

7. The self-service checkout system of claim 1, wherein, responsive to the one or more issues related to the identification of the items on the tray including an unrecognized item error, the executable instructions, when executed by the processor, cause the processor to provide a user interface for the customer that allows the customer to select an item from a menu of candidate items corresponding to the unrecognized item.

8. The self-service checkout system of claim 1, wherein, responsive to the one or more issues related to the identification of the items on the tray including an unrecognized item error, the executable instructions, when executed by the processor, cause the processor to provide a user interface for the customer that allows the customer to select an option that allows the customer to use a barcode scanner to identify the item.

9. The self-service checkout system of claim 1, wherein, responsive to the one or more issues related to the identification of the items on the tray including an item placement error, the executable instructions, when executed by the processor, cause the processor to provide a user interface to the customer that provides an image and associated bounding box that identifies an item associated with the item placement error.

10. A method, comprising:
    receiving a message from a vision system that includes a list of identified items on a tray positioned adjacent to the vision system for a current transaction and one or more issues related to an identification of the items on the tray;
    processing the message to identify the one or more issues related to the identification of the items on the tray;
    providing a user interface for a customer to correct the one or more issues related to the identification of the items on the tray;
    completing the current transaction once the issues related to the identification of the items on the tray are corrected; and
    wherein the message from the vision system includes a heartbeat field that, when set as active, provides an indication that the vision system is active and that any other information in the message is to be ignored.

11. The method of claim 10, wherein the message from the vision system is received via a communications link.

12. The method of claim 10, comprising operating a webserver.

13. The method of claim 12, wherein the message from the vision system is received by the webserver as an HTTP PUT message.

14. The method of claim 13, wherein the message from the vision system is formatted using extensible markup language.

15. The method of claim 10, comprising identifying that the heartbeat field in the message from the vision system is set as active.

16. The method of claim 10, comprising providing a user interface for the customer that allows the customer to select an item from a menu of items corresponding to the unrecognized item in response to the one or more issues related to the identification of the items on the tray including an unrecognized item error.

17. The method of claim 10, comprising providing a user interface for the customer that allows the customer to select an option that allows the customer to use a barcode scanner to identify the item in response to the one or more issues related to the identification of the items on the tray including an unrecognized item error.

18. The method of claim 10, comprising providing a user interface to the customer that provides an image and associated bounding box that identifies an item associated with the item placement error in response to the one or more issues related to the identification of the items on the tray including an item placement error.

* * * * *